US006587954B1

(12) United States Patent   (10) Patent No.: US 6,587,954 B1
Chiu   (45) Date of Patent: Jul. 1, 2003

(54) METHOD AND INTERFACE FOR CLOCK SWITCHING

(75) Inventor: Kenny Kok-Hoong Chiu, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/448,249

(22) Filed: Nov. 24, 1999

(51) Int. Cl.[7] .......................... G06F 1/12; G06F 11/00; H04L 12/50
(52) U.S. Cl. ........................ 713/400; 714/744; 370/358
(58) Field of Search .......................... 713/400; 714/731, 714/744; 370/358

(56) References Cited

U.S. PATENT DOCUMENTS 4,229,699 A * 10/1980 Frissell ........................ 327/114
5,155,380 A * 10/1992 Hwang et al. ............... 327/176
5,274,678 A * 12/1993 Ferolito et al. .............. 327/141

OTHER PUBLICATIONS

*MC68302 Integrated Multiprotocol Processor User's Manual*; Motorola, 1995, cover pages, table of contents, and pp. 4–16 through 4–19, and E17 through E19.

*ITU–T Telecommunication Standardization Sector of ITU*, International Telecommunication Union, 1988, 1993, cover pages and pp. 1–3.
*Reference Data Sheet, T7237 ISDN U–Interface Transceiver*, AT&T Microelectronics, Mar. 1996, pp. 49–52.
*Using the AM186™ES and AM188™ Microcontrollers in Communications Applications*, Advanced Micro Devices, Inc., Apr. 2, 1997.
*AM186™EM and AM188™EM Microcontrollers Uers's Manual*, Advanced Micro Devices, Inc., pp. i through Viii, 9–1 through 9–13, and 11–1 through 11–8.

* cited by examiner

Primary Examiner—Thomas Lee
Assistant Examiner—Suresh K Suryawanshi
(74) Attorney, Agent, or Firm—Akin Gump Strauss Hauer & Feld LLP (57) ABSTRACT

A clock switching technique allows selecting an input clock signal from any number of clock sources. Multiplexed input clock signals are switched on the fly onto an internal clock line coupled to an output clock line. Clock glitches are allowed on the output clock line. A clock invalid signal is asserted synchronous with the internal clock line during the time clock glitches may potentially be generated. The clock invalid signal signifies that clock switching is in progress and can be used to reset circuits which use the output clock line preventing problems in those circuits typically caused by clock glitches during the period of output clock instability. The clock switching technique is independent of clock source frequency as well as the system clock frequency.

27 Claims, 5 Drawing Sheets

METHOD AND INTERFACE FOR CLOCK SWITCHING

BACKGROUND OF THE INVENTION

1. Field of the Invention

The invention relates to microcontrollers and computer systems, and more particularly to microcontrollers which need to select a clock from a variety of possible clock sources.

2. Description of the Related Art

Specialized microcontrollers with integrated communication features are becoming particularly attractive for communications applications. A microcontroller, or an embedded controller, is uniquely suited to combining functionality onto one monolithic semiconductor substrate (i.e. chip). By embedding various communication features within a single chip, a communications microcontroller may Support a wide range of communication applications.

Microcontrollers have been used for many years in many applications. A number of these applications involve communications over electronic networks, such as telephone lines, computer networks, and local and wide area networks, in both digital and analog formats. In communications applications, a microcontroller generally has a number of integrated communications peripherals in addition to the execution unit. These can be low and high speed serial ports, as well as more sophisticated communications peripherals, such as a universal serial bus (USB) interface, and high level data link control (HDLC) channels.

For high speed communications that use frames of data, HDLC channels are especially well suited. An HDLC channel transmits and receives frames based on the HDLC format. This format uses flags to determine the start and stop of a frame, and uses "bit stuffing" to maintain data transparency. An HDLC channel, however, is a general purpose device, and can be employed to implement a number of communications protocols, such as the general circuit interface (GCI) protocol (similar to an IOM-2 protocol) sometimes used for ISDN (integrated services digital network) communications (similar to the IOM-2 protocol), a pulse coded modulation (PCM) highway protocol, as well as raw data communications equipment (DCE) formats. These formats are synchronous communication protocols that may or may not include a separate clock.

But communications employing the HDLC format can be further implemented within time slots of a lower level time division multiplexed framing protocol, such as a T1 or E1 protocol. This protocol employs 24 or 32 time slots of 8 bits each, and each time slot could be used to carry different communications data, even in different formats. In such protocols, the time slots are determined based on a frame sync signal, which can be embedded in the data stream, be embedded in a clock stream, or even a separate signal, depending on the communications protocol. Each such time slot, for example, could be implemented to carry a separate HDLC channel of data.

Further, a time slot assigner (TSA) can be coupled in a microcontroller to an HDLC channel for slot-level placement of the HDLC data on the external communication path. Such a TSA determines the start of a programmed time slot relative to the frame sync. This could be to provide the HDLC data within a particular time slot, or to further implement some sort of protocol that employs its own time slots, such as the protocol used for ISDN. In the GCI protocol, a frame is subdivided into two 8-bit B channels and a 2-bit D channel, which form two separate 8-bit and one 2-bit "slot" within a communications frame on the GCI bus.

More generally, a time slot assigner (TSA) typically supports the isolation of 8-bit slots from 0 to 155 on a standard 8 kilohertz time division multiplexed (TDM) frame. This supports a variety of TDM buses, including GCI, E1, T1, PCM highway, and others. Of course, other length frames, other speeds, and other numbers of slots can be supported as well.

Support for multiple communications protocols has typically implied multiple clock sources are present. For a processor-based device, when a clock source from a number of clock sources must be selected for a clock line, clock glitches have commonly occurred on the clock line during switching of a clock source to the clock line. The timing of processor-based devices thus has been susceptible to such clock glitches. Clock behavior has been particularly critical for processor-based devices which support multiple data communication protocols such as those described above.

SUMMARY OF THE INVENTION

A clock switching technique for a processor-based device allows selecting an input clock signal from any number of clock sources. A clock mode signal controls a clock source selection logic which selects an input clock signal onto an output clock line. A clock invalid signal is asserted upon detection of a change in the clock mode signal. The clock invalid signal is deasserted after a predetermined number of output clock cycles. In this way, the clock invalid signal envelops the clock switching time during which a glitch may potentially be generated. The deasserted state of the clock invalid signal informs other circuitry in the processor-based device that an output clock line is stable and can be used.

The technique involves a clock mode change tracking logic and a synchronous clock invalid duration counter. The synchronous clock invalid duration counter counts output clock cycles and indicates to the clock mode change tracking logic that the predetermined number of output clock cycles have elapsed. The clock mode change tracking logic enables the synchronous clock invalid duration counter, causes the assertion of the clock invalid signal when the clock mode change tracking logic detects a change in the clock mode signal, disables and resets the synchronous clock invalid duration counter and causes the deassertion of the clock invalid signal upon being signaled by the synchronous clock invalid duration counter after reaching a predetermined number of output clock cycles. The internal clock line can be buffered, producing an output clock line.

In one embodiment, a clock mode switch delay logic delays the clock mode signal such that the clock invalid signal is asserted before switching a different input clock signal to the output clock line.

In one embodiment, asserting a reset signal causes the clock source selection logic to switch a default input clock signal to the output clock signal and the deassertion of the clock invalid signal.

In a further embodiment, the clock source selection logic can switch two of the input clock signals to two output clock signals, providing a transmit clock signal and a receive clock signal. In another embodiment, a second clock source selection logic can switch a second plurality of input clock signals to a third output clock signal synchronously with the first clock source selection logic. In one embodiment, an input clock signal can be an input clock signal to both the first clock source selection logic and the second clock source selection logic.

One advantage of this clock switching technique is that the circuit design is synchronous in nature and easy to implement. An unlimited number of clock sources can be switched using this technique. In a system that has many sources of clocks, this technique provides a flexible system, simplifying the design of the clock switching circuit. Another advantage is that clock switching is personnel on the fly and the clock switching is allowed to glitch onto the output clock line while protecting circuitries using the output clock signal through the use of the clock invalid signal. A further advantage is that the period of time after the clock source selection logic switch occurs can be scaled independently of the number of input clock sources. Further, the clock selection technique works independently of the frequency of any of the clock sources or system clock frequency.

BRIEF DESCRIPTION OF THE DRAWINGS

A better understanding of the present invention can be obtained when the following detailed description of the preferred embodiment is considered in conjunction with the following drongs, in which.

DETAILED DESCRIPTION OF INVENTION

Figure 1A:
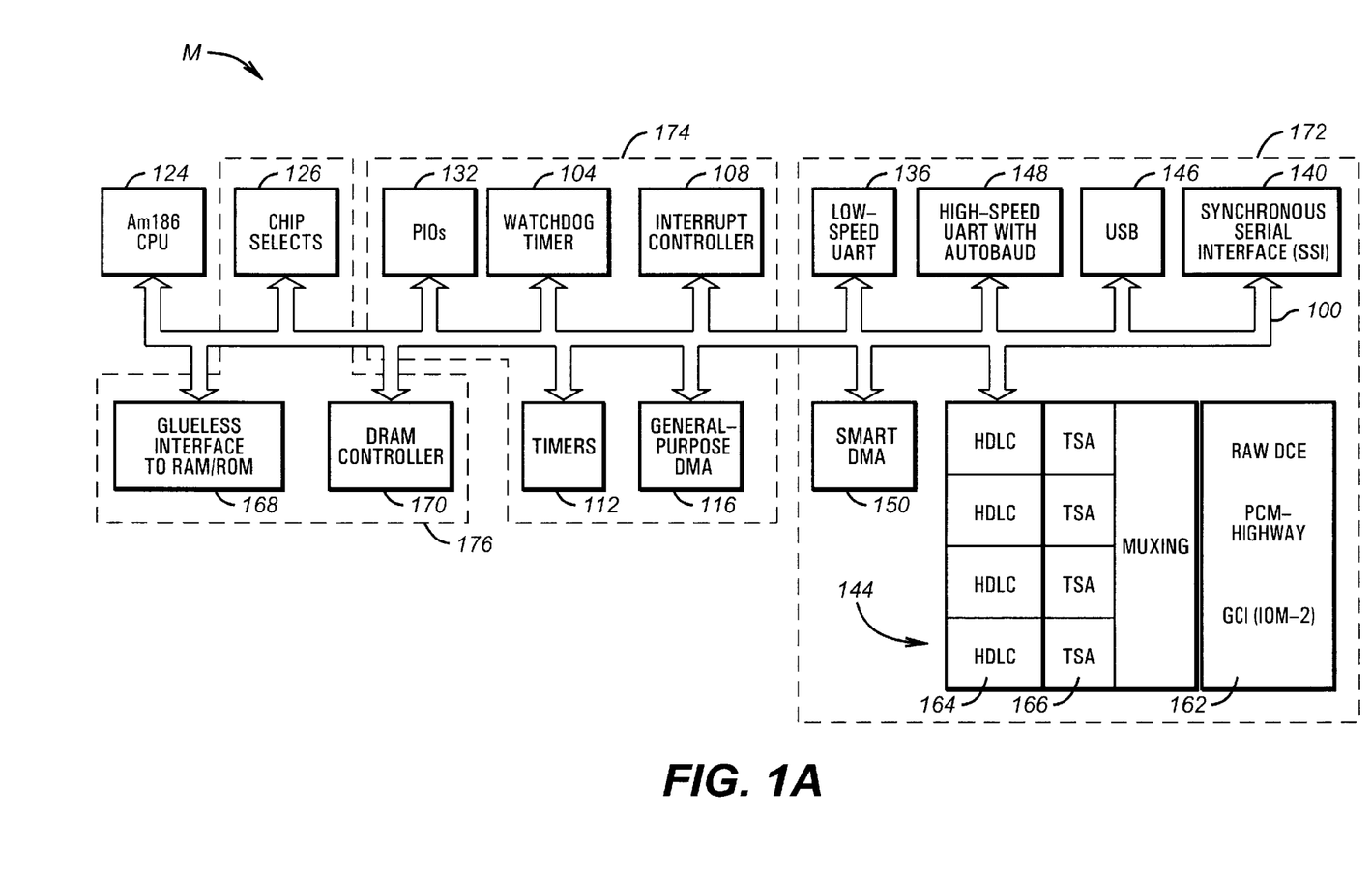
FIG. 1A is a block diagram of an exemplary microcontroller M containing an embodiment of the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176 and serial communication peripherals 172. The execution unit 124 in the disclosed embodiment is compatible with the Am186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three channel timer control unit 112. The timer control unit 112 includes three 16-bit programmable timers. Another system peripheral is a general purpose direct memory access (DMA) unit 116 with four channels 0–3. A programmable I/O unit 132 of the microcontroller M supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. Also in the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well suited to communications environments. To this end, the serial communication peripherals 172 of the microcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "SmartDMA" unit 150, a unit which provides for chained buffers that are accessed via pairs of DMA channels. The SmartDMA unit 150 allows for a high degree of packetized transfer without excessive execution unit 124 intervention. The SmartDMA unit 150 preferably consists of four SmartDMA controllers, SmartDMA0-3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. It should be understood that the microcontroller M may include multiple HSUARTs 148.

The disclosed HDLC controller 144 also includes an interface multiplexer 162. This multiplexer 162 couples the four HDLC channels 164, four time slot assigners (TSA) 166, and a number of external buses. Specifically, using the time slot assigners or otherwise, the HDLC channels 164 can be selectively coupled to a pulse code modulation (PCM) highway, a general circuit interface (GCI), a data carrier equipment (DCE) serial interface, and other general and specific external communication interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assigner 166 for assigning a portion of a serial frame to each HDLC for isochronous communication.

Figure 1B:
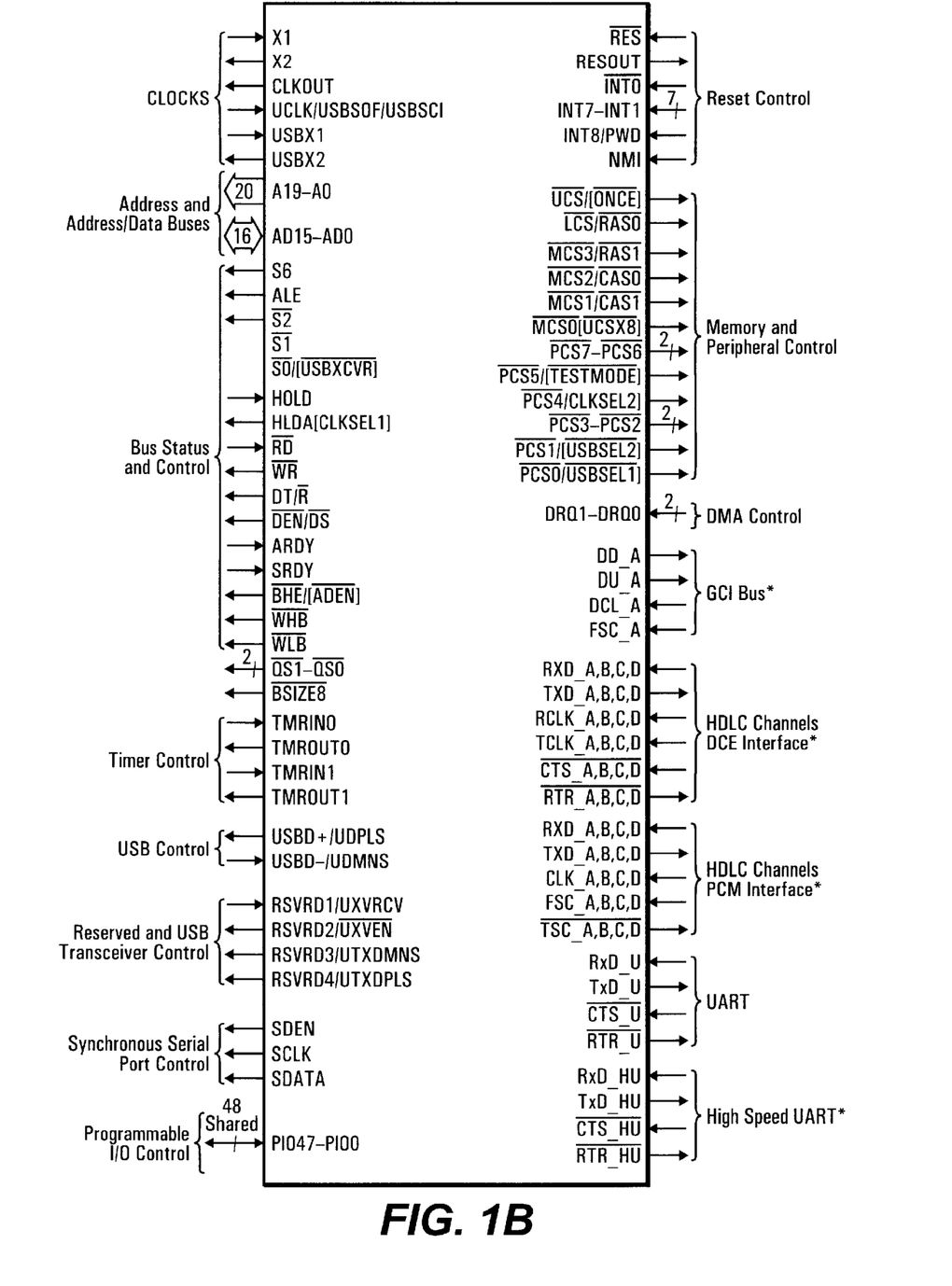
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts, address and address/data bus pinouts, bus status and control pinouts, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general purpose peripherals from FIG. 1A could be eliminated, or added to, without detracting from the spirit of the invention.

The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
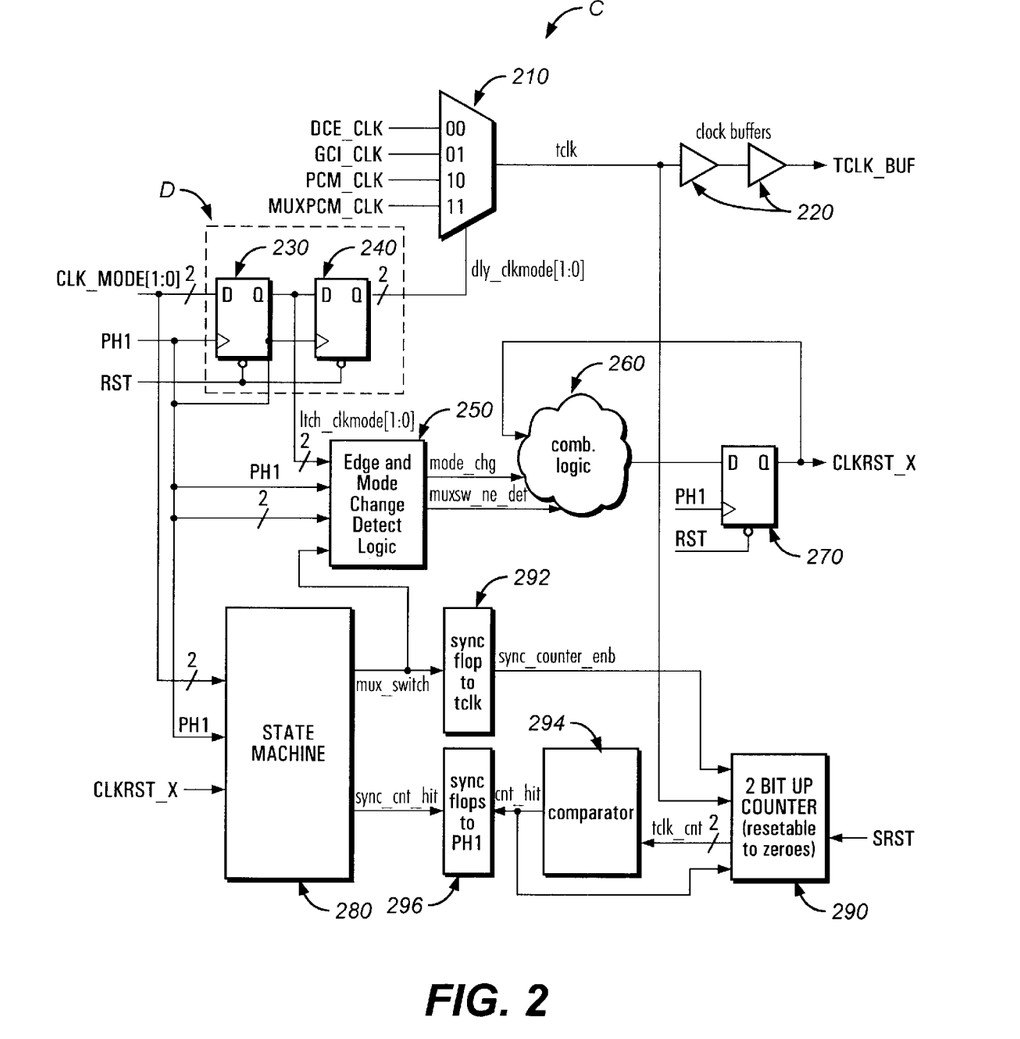
FIG. 2 is a diagram of an embodiment of an exemplary clock switching circuit C contained in the microcontroller of FIG. 1.

Turning to FIG. 2, a block diagram is shown of an exemplary embodiment of a clock switching circuit C contained in the microcontroller M. One skilled in the art will recognize that the microcontroller M can contain multiple clock switching circuits C without departing from the spirit of the invention. A two-bit signal CLK_MODE[1:0] defines the programmable clock selection mode for any one of four input clock sources (as shown in FIG. 2, DCE_CLK, GCI_CLK, PCM_CLK, and MUXPCM_CLK) to be selected onto an internal clock line TCLK. A system clock signal PH1, a reset signal RST, and a synchronous reset signal SRST are also available. The SRST signal is a version of the RST signal synchronized to the TCLK signal. The clock switching circuit C provides two output signals, TCLK_BUF and CLKRST_X, described below.

The four input clock sources are connected to a clock source selection logic 210, which uses a two-bit control signal DLY_CLKMODE[1:0] (a delayed version of the CLK_MODE[1:0] signal) to select one of the input sources onto the internal clock line TCLK. In the disclosed embodiment, the internal clock line TCLK is buffered by clock buffers 220 to produce the output clock line TCLK_BUF. This clock is then distributed to other circuitries in the microcontroller M. As explained below, the CLKRST_X signal indicates to other circuitries when the output clock line TCLK_BUF is stable.

The CLK_MODE[1:0] is gated through flip flop 230, producing a latched version of the signal, LTCH_CLKMODE[1:0]. LTCH_CLKMODE[1:0] is further gated through flip flop 240, producing the DLY_CLKMODE[1:0] signal which connects to and controls the operation of clock source selection logic 210. Flip flops 230 and 240 form a clock mode switch delay logic D. Because flip flops 230 and 240 are driven off the PH1 signal, the clock source selection logic 210 will delay switching clock signals on the TCLK line for two cycles of the PH1 clock after CLK_MODE[1:0] changes. During that two cycle delay, other portions of the circuit C have caused the CLKRST_X signal to be asserted. Therefore, the CLKRST_X signal is asserted prior to the switching of the clock source selection logic 210.

During the clock switch by the clock source selection logic 210, clock irregularities or glitches can potentially occur on the TCLK line, which could cause difficulties in circuitries driven by the TCLK_BUF signal. Because the CLKRST_X signal is already asserted, however, circuitries using the TCLK_BUF and CLKRST_X signals will be informed that a clock switch is in progress and can perform appropriate reset actions such as transitioning to a reset state of a state machine. CLKRST_X can be considered a clock invalid signal when asserted. Circuitries using the TCLK_BUF and CLKRST_X signals can remain in their reset state until the CLKRST_X signal is deasserted, indicating that the clock switch has been completed, the clock glitches should no longer occur, and the newly selected input clock signal switched onto TCLK_BUF is stable.

Detecting a change in the CLK_MODE[1:0] signal is performed by a EdgeAndModeChange logic 250. In a disclosed embodiment, the logic 250 detects a change in the CLK_MODE[1:0] signal by ORing the exclusive ORs of the respective bits of the CLK_MODE[1:0] signal and the LTCH_CLKMODE[1:0] signal, generating a MODE_ signal. Because the logic 250 is also driven by the PH1 signal, if CLK_MODE[1:0] changes, the MODE_CHG signal will be asserted and passed through a combinational logic 260 to a flip flop 270, also driven by PH1, which forms or serves as clock invalid generation logic to assert the CLKRST_X signal on the next rising edge of PH1. The CLKRST_X signal is also fed back to the combinational logic 260. The combinational logic 260 generally combines the MODE_CHG signal and a MUXSW_NE_DET signal for presentation to the flip flop 270. Those skilled in the art will appreciate that the combinational logic 260 can be implemented in a variety of ways. The MUXSW_NE_DET signal is generated by the EdgeAndModeChange logic 250 to indicate the completion of a clock mode change. The EdgeAndModeChange logic 250 generally serves as a clock mode change detect logic.

A clock mode change tracking logic 280 also monitors the CLK_MODE[1:0] signal and detects changes in the clock mode. If the clock mode change tracking logic 280 detects a change in the CLK_MODE[1:0] signal, it asserts a MUX_SWITCH signal to the logic 250 and a synchronization flip flop 292. The MUX_SWITCH signal is used to control the CLKRST_X signal. In a disclosed embodiment, the logic 250 includes edge detector logic which detects a falling edge of the MUX_SWITCH signal. Upon detecting the falling edge of the MUX_SWITCH signal, the logic 250 asserts the MUXSW_NE_DET signal to the combinational logic 260, causing the CLKRST_X to be deasserted by the clock invalid generation logic 270, indicating the clock switching is complete.

The MUX_SWITCH signal is also used to enable a two-bit synchronous clock invalid duration counter 290. Because the synchronous clock invalid duration counter 290 is synchronized to the TCLK signal and the MUX_SWITCH signal is synchronized to the PH1 signal, the MUX_SWITCH signal is passed to the synchronization flip flop 292, producing a SYNC_COUNTER_ENB signal synchronized to the TCLK line. When the SYNC_COUNTER_ENB signal is asserted from the clock mode change tracking logic 280 via the MUX_SWITCH signal assertion, the synchronous clock invalid duration counter 290 starts counting every TCLK clock cycle until a CNT_HIT signal is asserted, indicating the synchronous clock invalid duration counter should stop counting. A comparator 294 tracks the two-bit synchronous counter value signal TCLK_CNT generated by the synchronous clock invalid duration counter 290. The synchronous clock invalid duration counter 290 is used to determine the duration of the CLKRST_X assertion.

The TCLK_CNT signal is sent to the comparator 294, which in this case determines whether four TCLK cycles have elapsed. When the comparator 294 determines that four TCLK cycles have elapsed, it generates the CNT_HIT signal to stop the synchronous clock invalid duration counter 290. The CNT_HIT signal is synchronized to the PH1 clock by a synchronization flip flop 296, generating a SYNC_CNT_HIT signal to the clock mode change tracking logic 280. The clock mode change tracking logic 280 deasserts the MUX_SWITCH signal when the SYNC_CNT_HIT signal is asserted, causing the logic 250 to assert the MUXSW_NE_DET signal, which causes the combinational logic 260 to deassert the CLKRST_X signal. When the CLKRST_X signal is deasserted, it indicates that the TCLK_BUF signal is clean and stable without clock glitches, because at least four TCLK cycles have elapsed during the period while the CLKRST_X signal was asserted. Further, when the clock mode change tracking logic 280 deasserts the MUX_SWITCH signal, the synchronization flip flop 292 deasserts the SYNC_COUNTER_ENB signal, which causes the synchronous clock invalid duration counter 290 to reset itself. It should be understood that clock mode change tracking logic can be implemented as a state machine or in a variety of other ways.

Note that the entire clock switching circuit C runs synchronously, although some portions are synchronized to the PH1 signal while other portions are synchronized to the TCLK signal. Because the synchronous clock invalid duration counter 290 runs off of the TCLK signal, clock glitches caused by the clock source selection logic 210 switching clocks will not affect the remainder of the clock switching circuit C. At most, the synchronous clock invalid duration counter 290 can count faster due to glitches in the TCLK signal. Even though counting faster may shorten the duration of the assertion of the CLKRST_X signal, when the CLKRST_X signal is deasserted, the TCLK_BUF signal will be clean and stable for use, free of clock glitches. Note that the CLKRST_X signal is synchronous to PH1 and is free of glitches so as to be useful to other circuitries. Therefore the clock switching circuit C has guaranteed stability.

In one embodiment, the clock switching circuit C can be reset by asserting the RST signal. When the RST signal is asserted, the clock mode change tracking logic 280 will return to a reset state, the clock source selection logic 210 will switch to a default clock source (in FIG. 2 the DCE_CLK clock source), and the CLKRST_X signal will be deasserted. The SRST signal will also reset the synchronous clock invalid duration counter 290 synchronously with the TCLK signal.

One skilled in the art will recognize that the clock switching circuit C is not limited to four clock sources, but is scalable to an unlimited number of clock sources. Further, the synchronous clock invalid duration counter 290 is scalable to define any desired maximum number of new clock periods to expire after the clock source selection logic 210 switches to a different clock source before the TCLK_BUF signal is considered stable for use. The synchronous clock invalid duration counter 290 can be scaled independently of the number of clock sources.

One skilled in the art will also recognize that the synchronous design of the circuit C makes the design of the circuit C easy to implement, regardless of the number of clock sources or the maximum number of TCLK periods the CLKRST_X signal is asserted. Further, the delay logic circuit D can be scaled to further delay the clock source selection logic switch after the assertion of the CLKRST_X signal without departing from the spirit of the invention.

Figure 3:
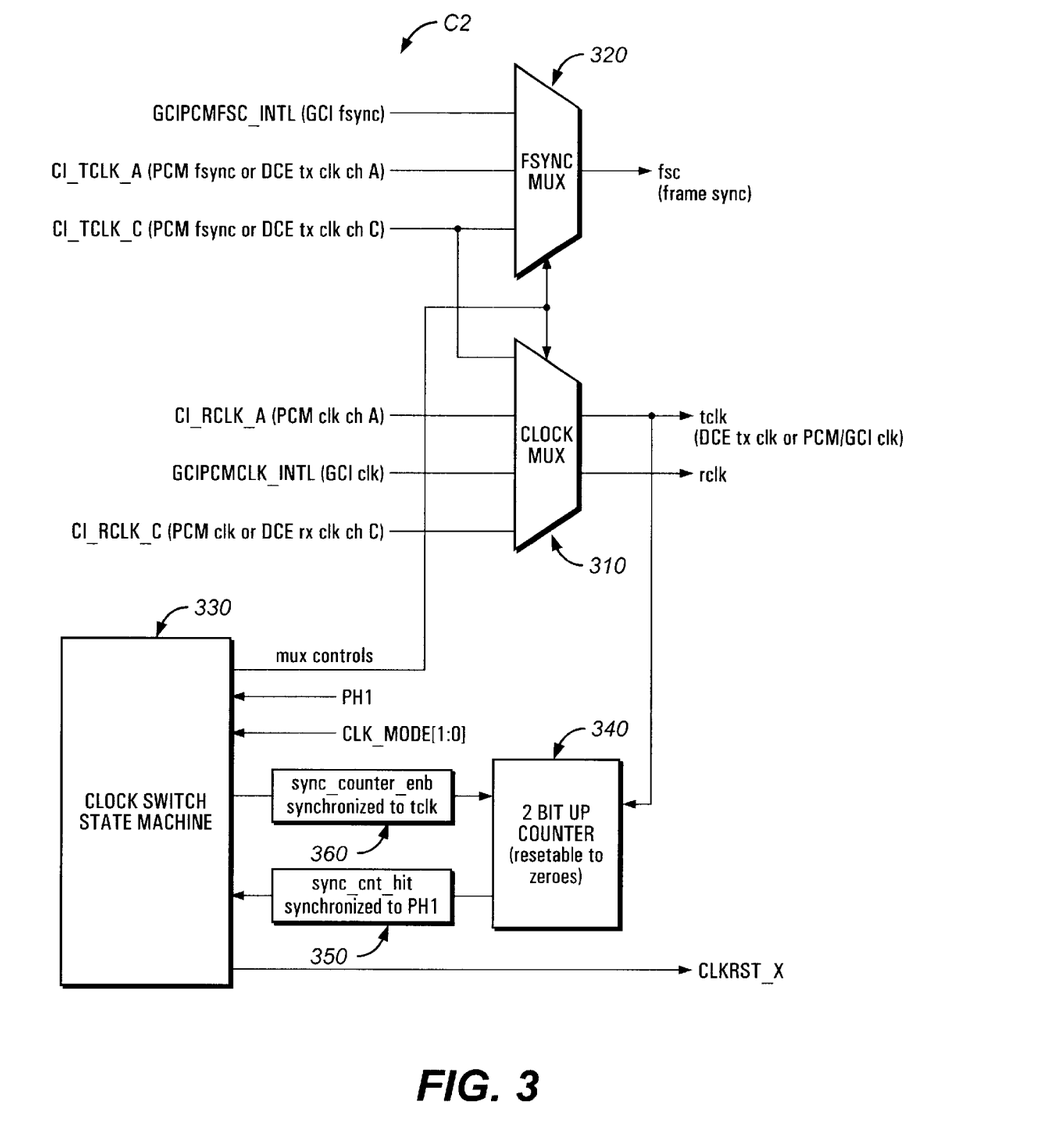
FIG. 3 is a block diagram of an embodiment of another exemplary clock switching circuit C2.

In another embodiment, a clock switching circuit C2 used in one of the HDLC channels 164 is shown in FIG. 3. Each of the HDLC channels 164 contains a clock switching circuit C2 with the input and output signals appropriately changed for each HDLC controller 164. A clock mode change tracking logic 330 (shown as a state machine) additionally performs the functions of the delay logic D, the state machine 280, the EdgeAndModeChange logic 250, the combinational logic 260, and the flip flop 270 of FIG. 2. The clock switching circuit C2 in FIG. 3 allows switching clock source selection logic 310 and 320 synchronously. As it did in FIG. 2, a two-bit CLK_MODE[1:0] signal indicates which input clock source is to be switched onto the TCLK line. Also as in FIG. 2, a two-bit synchronous clock invalid duration counter 340, controlled by the clock mode change tracking logic 330, controls the duration of the CLKRST_X signal assertion. However, in FIG. 3, the clock mode change tracking logic 330 generates a signal to both clock source selection logic 310 and clock source selection logic 320. Clock source selection logic 320 selects from a second collection of three clock sources (as shown in FIG. 3, GCIPCMFSC_INTL, CI_TCLK_A, and CI_TCLK_C) to generate a frame sync signal FSC. Further, of the four clock sources for clock source selection logic 310 (as shown in FIG. 3 CI_TCLK_C, CI_RCLK_A, GCIPCMCLK_INTL, and CI_RCLK_C) one (CL_TCLK_C) is simultaneously a clock source for both clock source selection logic 310 and clock source selection logic 320.

In addition, the clock mode change tracking logic 330 can control the clock source selection logic 310 in such a way as to select two output clock signals, a transmit clock signal TCLK and a receive clock signal RCLK. This allows clock switching circuit C2 to select both a transmit clock and a receive clock for circuits such a communications controller which separately clocks both transmit and receive data lines. One skilled in the art will recognize that any number of clock source selection logic could be controlled by the clock mode change tracking logic 330 without departing from the spirit of the invention. Furthermore, one skilled in the art could implement clock source selection logics with differing numbers of input and output lines without departing from the spirit of the invention.

The clock switching circuits C and C2 as disclosed are independent of the frequency of the system clock signal PH1 and independent of the frequency of the output clock signal TCLK. Furthermore, any convenient clock can be used as the source of the PH1 clock signal. Preferably, the highest system clock frequency available is used for the PH1 clock signal.

Figure 4:
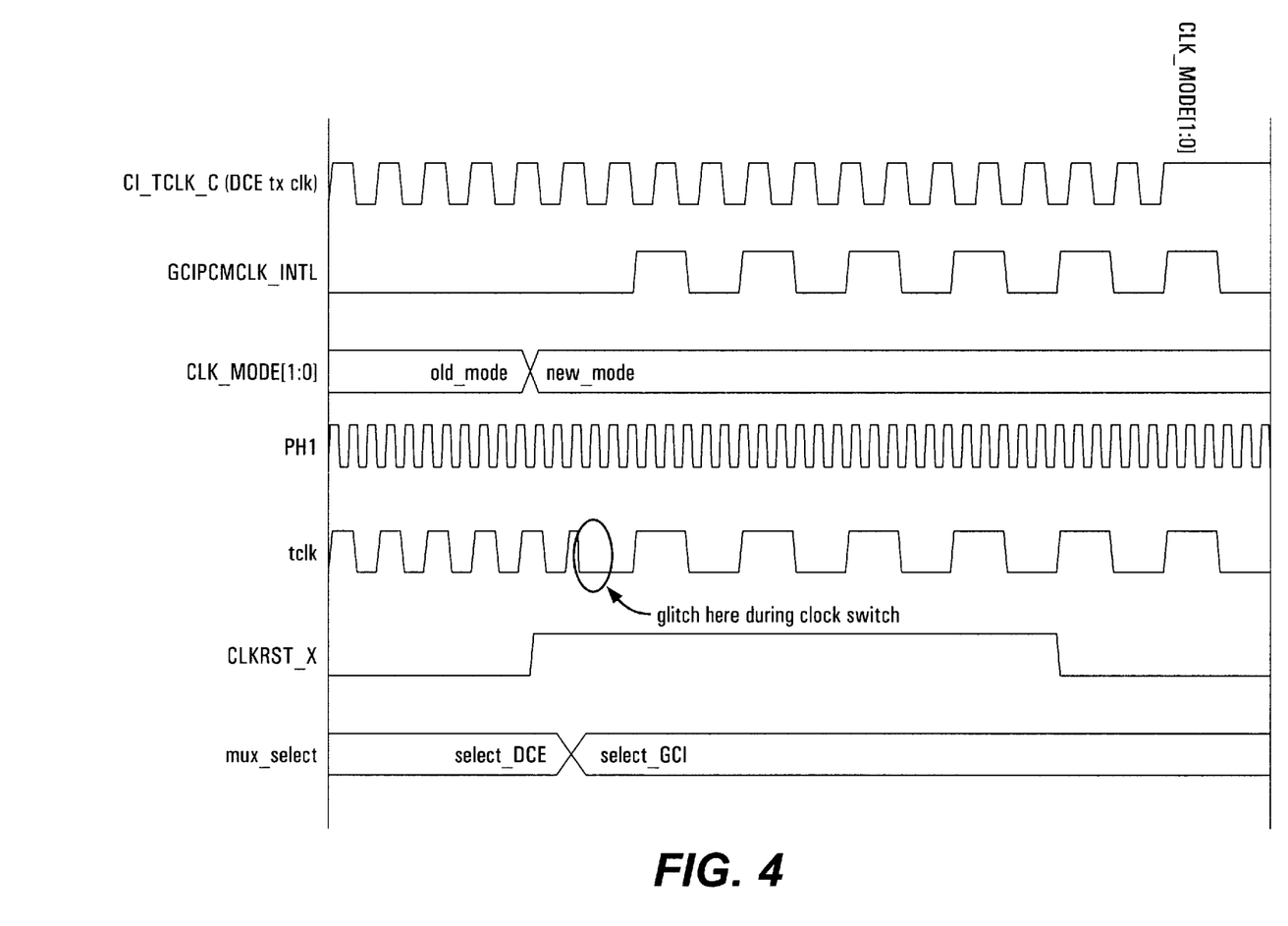
FIG. 4 is a timing diagram for switching between clock signals.

FIG. 4 shows a timing diagram of clock switching according to the clock switching circuit C2 of FIG. 3. As shown in FIG. 4, the TCLK line is switched from a DCE clock signal CI_TCLK_C to a GCIPCMCLK_INTL clock signal. The CLK_MODE[1:0] signal changes on the rising edge of PH1 clock cycle 11. The CLKRST_X signal was asserted in cycle 12 of clock signal PH1 by the clock mode change tracking logic 330. The MUX_SELECT signal from the clock mode change tracking logic 330 of FIG. 3 changes in clock cycle 13, causing the TCLK signal to switch from the DCE clock signal CI_TCLK_C to the GCI clock signal GCIPCMCLK_INTL. Note the clock glitch which occurs as the clock source selection logic 310 switches from one clock source to the other, creating a clock pulse shorter than the pulse of either input clock signal. Depending on the timing of the various signals, the clock glitch could be shorter than either input clock signal's pulse or longer than either clock signal's pulse. This clock glitch could cause problems in circuitries using the TCLK output clock signal if the CLKRST_X signal had not been asserted. Because the CLKRST_X signal was asserted, circuitries using the TCLK output signal will have gone into a reset state to avoid clock glitch problems, staying in the reset state until the CLKRST_X signal is deasserted. Then, four TCLK clock cycles (now GCIPCMCLK_INTL cycles) later, the CLKRST_X signal is deasserted by the clock mode change tracking logic 330 of FIG. 3, indicating that the TCLK signal is clean and safe to use.

Those skilled in the art will appreciate that the disclosed clock switching circuitry can be implemented in a hardware description language such as VJerilog or VHDL. Further, it should be understood that the disclosed clock switching techniques can be applied to a variety of processor-based devices other than microcontrollers.

The foregoing disclosure and description of the various embodiments are illustrative and explanatory thereof, and various changes in the components, circuit elements, signals, and wiring connections, as well as in the details of the illustrated circuitry and construction and method of operation may be made without departing from the spirit of the invention.

We claim:

1. A clock selection device comprising:
   a first clock source selection logic adapted to select from a first plurality of input clock signals based on the value of a clock mode signal, producing an output clock line;
   a clock mode change tracking logic, the clock mode change tracking logic
      receiving a clock mode signal and a clock invalid signal and
      generating a clock mode change detect signal upon detection of a change in the clock mode signal,
   the clock mode change tracking logic
      deasserting the clock mode change detect signal upon an assertion of a synchronous clock invalid duration elapsed signal and
      asserting a synchronous clock invalid duration counter reset signal upon an assertion of the synchronous clock invalid duration elapsed signal;
   a clock mode change detect logic coupled to the clock mode change tracking logic, the clock mode change detect logic
      receiving the clock mode change detect signal, asserting a clock mode change signal upon detection of a change in the clock mode signal, and
      asserting a detect clock mode change complete signal upon a deassertion of the clock mode change detect signal;
   a clock invalid generation logic coupled to the clock mode change detect logic, the clock invalid generation logic
      receiving the clock mode change signal and the detect clock mode change complete signal,
      asserting a clock invalid signal to indicate the output clock line is unstable upon an assertion of the clock mode change signal, and
      deasserting the clock invalid signal to indicate the output clock line is stable upon an assertion of the clock mode change complete signal; and
   a synchronous clock invalid duration counter coupled to the first clock source selection logic, the synchronous clock invalid duration counter
      counting clock cycles on the internal clock line, and
      generating the synchronous clock invalid duration elapsed signal after counting a predetermined number of clock cycles on the output clock line,
   wherein the clock mode change detect signal enables the synchronous clock invalid duration counter,
   wherein the synchronous clock invalid duration counter is disabled and reset upon an assertion of the synchronous clock invalid duration counter reset signal, and
   wherein a synchronous reset signal synchronized with the output clock line resets the synchronous clock invalid duration counter.

2. A clock selection device as in claim 1, further comprising:
   a clock mode switch delay logic coupled to the first clock source selection logic and the clock mode change tracking logic, the clock mode switch delay logic delaying the clock mode signal to define a clock mode to be selected by the first clock source selection logic, producing a delayed clock mode signal to control the switching of the first clock source selection logic, the clock mode switch delay logic latching the clock mode signal, producing a latched clock mode signal,
   wherein the clock mode change detect logic detects a change in the clock mode signal by detecting a change in the latched clock mode signal.

3. A clock selection device as in claim 1, further comprising:
   a stop count logic coupled to the synchronous clock invalid duration counter and the clock mode change tracking logic adapted to stop the synchronous clock invalid duration counter.

4. A clock selection device as in claim 1, wherein the clock mode change tracking logic comprises a state machine.

5. A clock selection device as in claim 1, wherein the first clock source selection logic comprises a multiplexer.

6. A clock selection device as in claim 2, wherein the clock mode switch delay logic delays the clock mode signal such that the clock invalid signal is asserted before the first clock source selection logic switches a different input clock source to the internal clock line.

7. A clock selection device as in claim 1, further comprising:
   a buffer coupled to the output clock line, producing a buffered output clock signal.

8. A clock selection device as in claim 1,
   wherein the first clock source selection logic can select a plurality of input clock sources, and
   wherein the first clock source selection logic can produce more than one output clock line.

9. A clock selection device as in claim 1, further comprising:
   a second clock source selection logic coupled to a second plurality of inuput clock sources, adapted to produce a second output clock line, the second clock source selection logic selecting one of the second plurality of clock sources synchronously with the first clock source selection logic.

10. A clock selection device as in claim 9, wherein a clock source can be simultaneously one of the first plurality of the input clock sources and the second plurality of the input clock sources.

11. A clock selection device as in claim 2, further comprising:
   a system clock adapted to produce a system clock signal coupled to and synchronizing the clock mode switch delay logic, the clock mode change tracking logic and the clock invalid generation logic.

12. A clock selection device as in claim 2, further comprising:
- a reset signal, the reset signal resetting the clock mode switch delay logic, the clock source selection logic, the clock mode change tracking logic, the clock mode change detection logic, and the clock invalid generation logic; and
- a synchronous reset signal synchronized with the internal clock line, the synchronous reset signal resetting the synchronous clock invalid duration counter,
- wherein resetting the clock invalid generation logic deasserts the clock invalid signal, and
- wherein resetting the clock source selection logic selects a default one of the first plurality of input clock signals.

13. A processor-based device comprising:
- a processor;
- a plurality of communication controllers coupled to the processor, each of the plurality of communication controllers comprising:
  - a plurality of clock sources; and
  - a clock selection device coupled to the plurality of clock sources adapted to select one of the plurality of clock sources for clocking the communications controller, the clock selection device comprising:
    - a first clock source selection logic adapted to select from a first plurality of input clock signals based on the value of a clock mode signal, producing an output clock line;
    - a clock mode change tracking logic, the clock mode change tracking logic
      - receiving a clock mode signal and a clock invalid signal and
      - generating a clock mode change detect signal upon detection of a change in the clock mode signal,
    - the clock mode change tracking logic
      - deasserting the clock mode change detect signal upon the assertion of a synchronous clock invalid duration elapsed signal and
      - asserting a synchronous clock invalid duration counter reset signal upon the assertion of the synchronous clock invalid duration elapsed signal;
    - a clock mode change detect logic coupled to the clock mode change tracking logic, the clock mode change detect logic
      - receiving the clock mode change detect signal,
      - asserting a clock mode change signal upon detection of a change in the clock mode signal, and
      - asserting a detect clock mode change complete signal upon deassertion of the clock mode change detect signal;
    - a clock invalid generation logic coupled to the clock mode change detect logic, the clock invalid generation logic
      - receiving the clock mode change signal and the detect clock mode change complete signal,
      - asserting a clock invalid signal to indicate the output clock line is unstable upon assertion of the clock mode change signal, and
      - deasserting the clock invalid signal to indicate the output clock line is stable upon assertion of the clock mode change complete signal; and
    - a synchronous clock invalid duration counter coupled to the first clock source selection logic, the synchronous clock invalid duration counter counting clock cycles on the internal clock line, and generating the synchronous clock invalid duration elapsed signal after counting a predetermined number of clock cycles on the output clock line,
  - wherein the clock mode change detect signal enables the synchronous clock invalid duration counter,
  - wherein the synchronous clock invalid duration counter is disabled and reset upon assertion of the synchronous clock invalid duration counter reset signal, and
  - wherein a synchronous reset signal synchronized with the output clock line resets the synchronous clock invalid duration counter.

14. A processor-based device as in claim 13, the clock selection device further comprising:
- a clock mode switch delay logic coupled to the first clock source selection logic and the clock mode change tracking logic, the clock mode switch delay logic delaying the clock mode signal to define a clock mode to be selected by the first clock source selection logic, producing a delayed clock mode signal to control the switching of the first clock source selection logic, the clock mode switch delay logic latching the clock mode signal, producing a latched clock mode signal,
- wherein the clock mode change detect logic detects a change in the clock mode signal by detecting a change in the latched clock mode signal.

15. A processor-based device as in claim 13, the clock selection device further comprising:
- a stop count logic coupled to the synchronous clock invalid duration counter and the clock mode change tracking logic adapted to stop the synchronous clock invalid duration counter.

16. A processor-based device as in claim 13, wherein the clock mode change tracking logic comprises a state machine.

17. A processor-based device as in claim 14, the clock selection device further comprising:
- a system clock adapted to produce a system clock signal coupled to and synchronizing the clock mode switch delay logic, the clock mode change tracking logic, and the clock invalid generation logic.

18. A method of selecting one of a plurality of clock sources onto a single output clock line, comprising the steps of:
- (a) receiving a plurality of input clock signals;
- (b) receiving a clock mode signal;
- (c) connecting one of the plurality of input clock signals to an internal clock line coupled to the output clock line;
- (d) detecting a change in the clock mode signal;
- (e) asserting a clock invalid signal responsive to step (d);
- (f) switching a different input clock signal to the internal clock line responsive to step (d),
- (g) waiting a predetermined number of output clock cycles; and
- (h) deasserting the clock invalid signal,
- wherein the output clock line is unstable while the clock invalid signal is asserted.

19. A method as in claim 18, the step of waiting a predetermined number of output clock cycles comprising the steps of:

counting the predetermined number of output clock cycles;

signaling that the predetermined number of output clock cycles has passed;

disabling the counting step responsive to the signaling step synchronously with the output clock line; and enabling the counting step responsive to step (d).

20. A method as in claim 18, furthering comprising the step of:

delaying the clock mode signal to assure step (f) occurs prior to step (e).

21. A method as in claim 18, furthering comprising the step of:

buffering the output clock line to generate a buffered output clock line.

22. A method as in claim 18, wherein the steps (e), (f), and (h) are synchronized to a system clock.

23. A method as in claim 18, further comprising the step of:

resetting a clock invalid count based on the clock invalid signal synchronous with the output clock line.

24. A method as in claim 18, further comprising the step of:

switching a second of the plurality of input signals to a second output line synchronously with step (f).

25. A method as in claim 18, further comprising the steps of:

receiving a second plurality of input signals; and switching one of the second plurality of input signals to a third output line simultaneously with step (f).

26. A clock switching mechanism with guaranteed stability, comprising:

a clock switching means for switching a clock source of a plurality of clock sources to an output clock line;

a clock invalidation means for generating a clock invalid signal synchronous to a system clock to indicate when clock switching by the clock switching means is in progress, the output clock line being stable when the clock invalid signal is set to a first predetermined state indicating clock switching is complete and the output clock line being unstable when the clock invalid signal is set to a second predetermined state indicating clock switching is in progress; and a synchronous clock counting means for counting a duration if the clock invalid signal is set to the second predetermined state, the synchronous clock counting means being synchronous with the internal clock line.

27. A clock switching mechanism as in claim 26, further comprising:

a clock switch detection means for detecting when clock switching by the clock switching means is initiated.

* * * * *

UNITED STATES PATENT AND TRADEMARK OFFICE
CERTIFICATE OF CORRECTION

PATENT NO.    : 6,587,954 B1
DATED         : July 1, 2002
INVENTOR(S)   : Chiu

It is certified that error appears in the above-identified patent and that said Letters Patent is hereby corrected as shown below:

<u>Column 9,</u>
Line 64, replace "internal" with -- output --.

<u>Column 11,</u>
Line 9, replace "synclironous" with -- synchronous --.

Signed and Sealed this

Eleventh Day of November, 2003

JAMES E. ROGAN
*Director of the United States Patent and Trademark Office*